United States Patent [19]

Miller

[11] 3,778,529

[45] Dec. 11, 1973

[54] MOISTURE-RESISTANT HOUSING FOR ELECTRICAL COMPONENTS AND METHOD AND APPARATUS FOR MAKING THE SAME

[75] Inventor: Imrich M. Miller, Paterson, N.J.

[73] Assignee: Universal Manufacturing Corporation, Paterson, N.J.

[22] Filed: May 11, 1972

[21] Appl. No.: 252,427

[52] U.S. Cl. .......... 174/52 PE, 174/DIG. 2, 220/75, 264/272

[51] Int. Cl. .......... H05k 5/06

[58] Field of Search .......... 174/52 PE, 52 R, 174/DIG. 2, 50; 336/96; 220/75, 76, 79; 264/272, 262, 264, 275–278

[56] References Cited

UNITED STATES PATENTS

| | | | |
|---|---|---|---|
| 2,444,312 | 6/1948 | Roberds et al. | 220/75 X |
| 1,837,051 | 12/1931 | Kohman | 220/75 X |
| 3,584,106 | 6/1971 | Miller | 174/DIG. 2 |
| 3,141,049 | 7/1964 | Parsons | 174/DIG. 2 |

*Primary Examiner*—Bernard A. Gilheany
*Assistant Examiner*—D. A. Tone
*Attorney*—Harvey W. Mortimer et al.

[57] ABSTRACT

A cover is provided over a housing containing various electrical components which, upon formation with a seam to make the housing substantially waterproof, has a channel portion formed which can flex in response to an outward force generated within the housing. A guide plate having spacers is provided for use during the potting of the electrical components which forms areas within the housing for receiving the channel portion of the cover formed during the seaming of the cover to the housing.

14 Claims, 6 Drawing Figures

MOISTURE-RESISTANT HOUSING FOR ELECTRICAL COMPONENTS AND METHOD AND APPARATUS FOR MAKING THE SAME

BACKGROUND OF THE INVENTION

This invention relates to the manufacture of electrical devices and more particularly to a method and apparatus for potting and waterproofing electrical components within a housing.

When electrical components such as ballast transformers for fluorescent lamps are used out-of-doors such, for example, as in billboards, signs, etc., it frequently happens that moisture from rain or snow penetrates the housing within which the electrical components are contained. In such cases, it is not unusual for a malfunction to occur in the operation of the component. These malfunctions in the electrical components caused by moisture are, of course, undesirable.

The moisture gains entry into the interior of the housing which contains the electrical component in one or both of two ways. First, since the housing is often made of more than one part in order to place the electrical components therein, an interface between the parts is necessarily formed which can provide a passage for moisture into the interior of the housing. Secondly, the electrical components have at least two lead wires for connection to a power supply or another component. An opening is provided in the housing for the lead wires and this opening often permits unwanted moisture to enter the housing.

In many packaging applications a potting compound of insulating material if often provided within the open housing in intimate contact with the electrical components to protect the components. The potting compound is often applied during the final assembly stage of the device into the housing by pouring the compound, which has been placed in a flowable state by heating or a chemical reaction, into the housing. A cover is then fastened over the open top of the housing and the potting compound allowed to cool to form a solid mass which serves to protect the enclosed electrical components. Often, when too much potting compound is inadvertently provided within the housing, the heat generated by the electrical components during their operation causes the compound to expand by an amount sufficient to buckle the cover so that some of the hot compound can leak out. This adversely affects the operation of the device and also creates a hazard to safety.

SUMMARY OF THE INVENTION

Accordingly, an object of this invention is to provide a new and improved housing for electrical components and a method and apparatus for producing the same.

Another object is the provision of a new and improved housing and a method and apparatus for protecting electrical components from moisture.

Still another object is to provide a connection between a cover and a housing containing electrical components which will reduce the possiblity of entrance of moisture into the housing interior.

A further object is to provide a cover for an electrical component containing housing which, upon formation with a seam to make the housing substantially moistureproof, also provides a portion which can flex or bend in response to an outward force generated within the device without rupturing or separating the cover from the housing.

A still further object of this invention is the provision of a guide plate which facilitates the introduction of the potting compound into the housing and which has spacers formed thereon to provide void areas within the housing in which flexing portions of the cover may be received when the moistureproofing seam is formed.

In accordance with a preferred embodiment of this invention, these and other objects are attained by providing a cover over a housing containing various electrical components, which cover is connected to the housing with a seam to make the housing substantially waterproof. Upon formation of the seam, a flexible portion is provided in the cover which can bend in response to an outward force from within the housing generated by excess potting compound expanding due to the heat incident to the operation of the electrical components, so that the cover will not rupture or separate from the housing. A guide plate is also provided for use during the potting operation which forms areas within the housing void of potting compound which receive the cover flexible portion.

DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
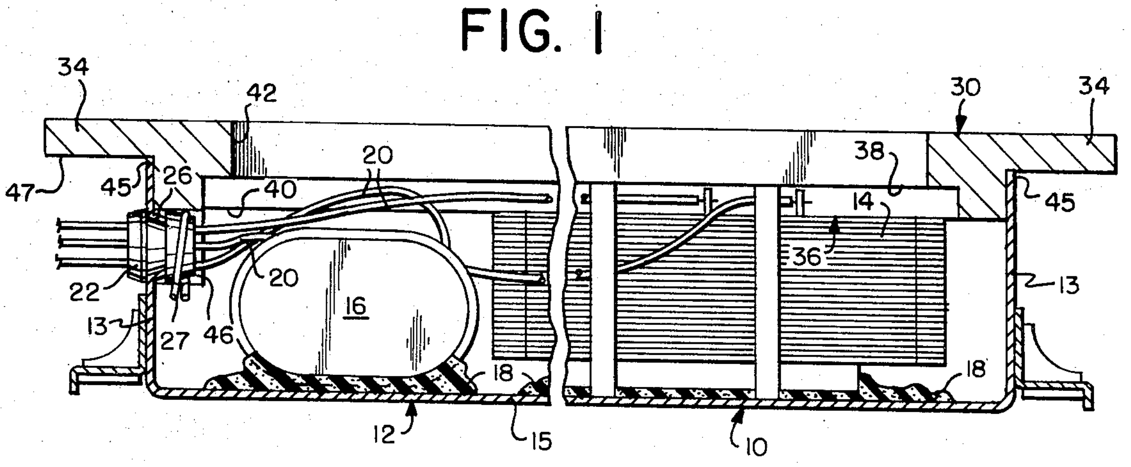
FIG. 1 is a side elevational view in partial section of a fluorescent lamp ballast transformer and the guide plate assembled onto the transformer housing according to the present invention.

Referring now to the drawings wherein like reference characters designate identical or corresponding parts throughout the several views, FIG. 1 shows a flurescent lamp ballast 10. The ballast includes a substantially rectangular housing 12 having side and bottom walls 13 and 15 which may be made of any suitable metallic material. Located within housing 12 are various electrical components such as a shell or core-type transformer 14 and a capacitor 16. However, it should be understood that the invention is not limited to the particular electrical devices described and may be practiced using other components. The electrical devices are fastened within housing 12 by suitable adhesive material 18 such as, for example, potting compound. The transformer and capacitor have a plurality of electrical lead wires 20 which permit the connection of these components to the power source and the fluorescent lamps (not shown). The lead wires 20 pass into housing 12 through a fitting 22 which is fixed in an opening within one of the housing side walls 13. Side wall 13 has a portion bent to form an inwardly extending, tapered collar 26. The collar 26 holds the body of the fitting which is also tapered to conform to the shape of the collar. A pair of opposed shoulders 28 are formed on the opposite sides of the fitting body and each shoulder bears against one end of the collar 26 to effectively seal the opening in the wall from the passage of moisture from one side to the other. The shoulders are formed of a yielding material such as rubber so that the fitting may be force-fit into the opening in the side wall. The lead wires 20 have a suitable plastic insulating material such as polyvinyl chloride plastic. Additional lead wires may also be passed into housing 12 through a similar arrangement at the opposite wall of the housing (not shown). Further, hose clamp 27 may be provided over the inner shoulder 28 to compress the fitting 22 around wires 20, thereby fixing the wires in the fitting and also providing a good seal to moisture.

To protect the electrical components contained within the housing from the deleterious effects of moisture, a cover 48 is provided to close the housing. The cover is fastened to the housing by a double seam arrangement, described in detail hereinbelow, formed between the peripheral edge of the cover and the upper edges of the side walls of the housing 12.

As is conventional in devices of this kind, prior to fastening the cover 48 to the housing, hot potting compound is poured into the housing around the electrical components which, upon cooling, solidifies to provide protection therefor. As also mentioned above, often too much potting compound is inadvertently provided within the housing, and the heat generated by the various electrical components can cause the compound to expand thereby resulting in an outwardly directed force to bear against the cover. In the past, this force has caused the cover to rupture or separate from the housing. In order to minimize the effects of this occurrence, a channel is provided within the cover during the formation of the seam which permits the cover to act as a diaphragm and flex and thereby change its shape to reduce the tendency of the cover to rupture and/or separate. Further, the amount of potting material poured into the housing is precisely controlled through the use of a guide plate 30 which is insertable within the housing during the potting operation. The guide plate also provides void areas within the housing receivable of the channel provided in the cover during the formation of the seam.

Figure 2:
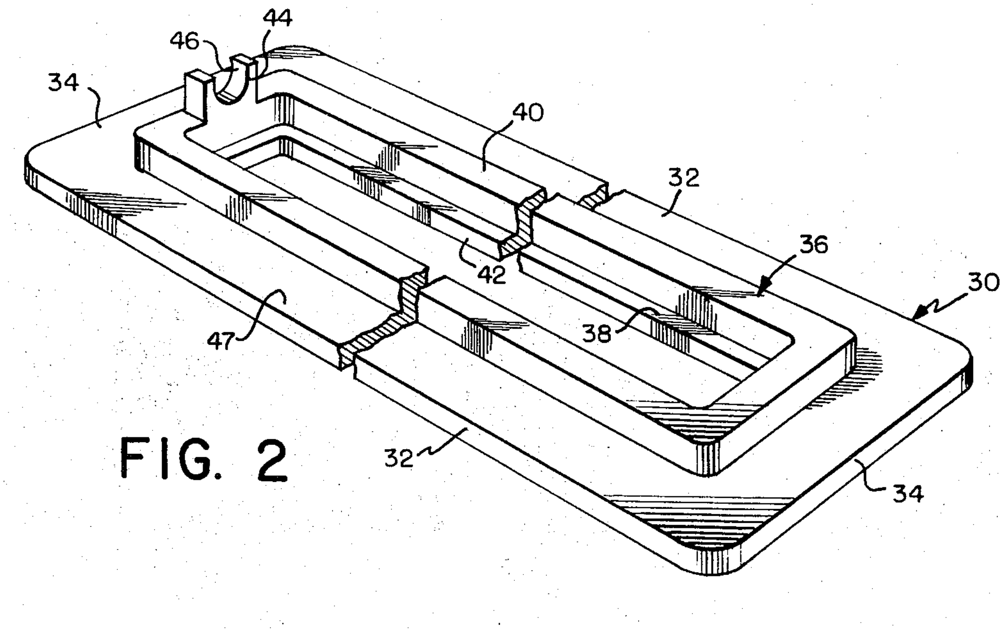
FIG. 2 is a perspective view of the bottom of the guide plate.

To continue with the description of the assembly of the device, after the electrical components are fixed within the housing, hot potting compound is poured into the housing through its open top. A guide plate 30 formed of any suitable material, such as a smooth polished metal, having a generally rectangular shape is shown in FIG. 2 is provided for use during the potting operation. The guide plate is formed by a pair of side legs 32 connected at their ends by a pair of bridging end legs 34. The inwardly facing edges of the side and end legs have a downwardly extending enlarged flange formed thereon defining spacer 36 which follows the generally rectangular configuration of the guide plate and defines guide plate opening 42. Spacer 36 includes spaced, parallel upper and lower surfaces 38 and 40, respectively, which preferably are substantially horizontal. The spacer may also be provided separately from the guide plate and fastened thereto by bolts or other conventional connectors. A projection 44 is centrally provided on the lower spacer surface 40 of one end leg 34 and has a notch 46 formed therein.

As shown in FIG. 1, prior to adding the potting compound into the housing, the plate 30 is placed on the open top of housing 12 by inserting the spacer 36 within the housing. The spacer is formed with suitable dimensions so that it is snugly received within the housing top. The plate is moved down into the housing until its bottom surface 47 contacts the edge of side walls 13 (FIG. 1). This procedure generally follows the one described in U.S. Pat. No. 3,584,106 to I. M. Miller, granted June 8, 1971. The notch 46 formed in projection 44 fits over the portion of fitting 22 which extends into the interior of housing 12 and serves to protect it from the hot potting compound which is subsequently introduced. It is obvious that different size guide plates and spacers must be used with various sizes of housings.

Figure 3:
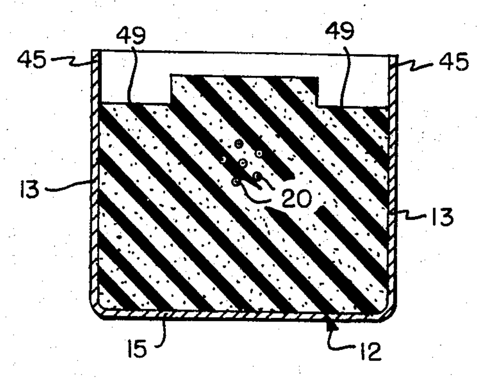
FIG. 3 is a front elevational view taken in section of the transformer housing subsequent to the potting operation prior to assembling the cover thereon.

In the potting operation, the guide plate 30 is usually supplied cold from a refrigerated apparatus so that the potting compound will not stick to it. After the cold guide plate is mounted on the housing with the spacer being received as described hereinabove, the hot potting compound is poured into housing 12 through the opening 42 in the guide plate until it reaches the level of upper space surface 38. Upper spacer surface 38 serves as a guide for measuring the proper amount of potting compound to be poured. It is slightly lower than the plane defined by the edge of side walls 13 to provide a predetermined upper portion 45 (FIG. 3) of the side walls to be bent during the cover-connecting operation (FIG. 4) while still maintaining the top of the housing above the upper surface of the solidified potting compound. Lower surface 40 extends to even a greater depth within the housing than upper surface 38 in order to provide a void area 49 (FIG. 3) about the interior periphery of the housing adjacent to the side walls into which no potting compound can flow. When the potting compound cools and plate 30 is removed, these voids are available to receive a channel 50 formed in the cover as described below.

After the potting is completed and the guide plate 30 removed from the housing, cover 48 is positioned over the top of the housing with its peripheral edge extending over the edges of the side walls to completely cover the opening. At this point, cover 30 comprises a substantially flat metallic plate. A roller is used to form a double seam 51 (FIG. 4) wherein the upper portions 45 (FIG. 3) of side walls 13 are bent outwardly at right angles. As the seam is being formed, the roller depresses a peripheral portion of the cover thereby forming channel 50 which extends around the perimeter of the cover. Thus, the purpose of void 49 is readily apparent, viz. to receive the depressed channel 50. Were void 49 not formed within the housing, the seam and channel formation would interfere with the solidified potting compound and possibly force some out of the housing.

Figures 4, 5, 6:
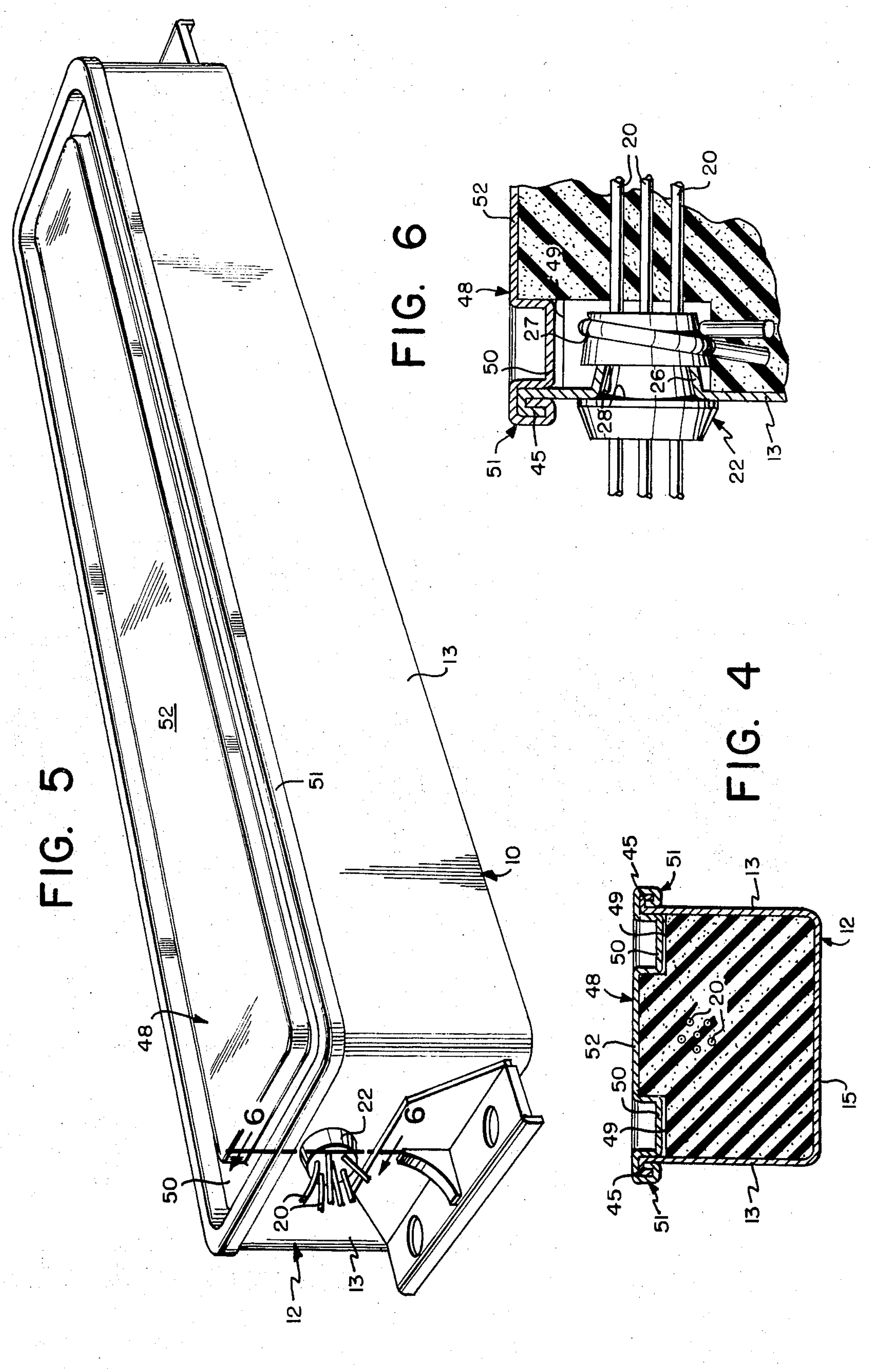
FIG. 4 is a front elevational view taken in section of the transformer housing with the cover assembled thereon.
FIG. 5 is a perspective view of the completed ballast transformer housing according to the present invention.
FIG. 6 is a detail view taken in section along line 6—6 in FIG. 5 of the lead wire fitting according to the present invention.

The channel portion 50 and the top portion 52 of cover 48 cooperate to function as a diaphragm. Should the potting compound expand excessively due to heating, the cover will yield outwardly. In other words, the cover will tend to flatten out with the angle formed at the two interior channel corners tending to increase as the seam acts as a fulcrum point. The particular seam configuration shown in the preferred embodiment is particularly good for the purpose of preventing the entrance of moisture into the housing since it presents no less than four right angle bends, each bend increasing the sealing efficiency of the seam. Of course, seams having other configurations than the one shown in the preferred embodiment may be used according to the present invention. It is also seen in FIG. 6 that the fitting 22 has not been potted but rather was protected by the projection 44 of guide plate 30 fitted thereover during the potting operation. The seam is continuously formed around the perimeter of housing 12.

The continuous double rolled seam serves to prevent the entrance of moisture into the interior of the housing. The fitting also serves as a moistureproofing element preventing the entrance of moisture through the opening formed in the housing side wall necessary for the passage of the electrical wires. The channel formed in the cover of the housing permits flexure of the cover as a diaphragm should excess potting compound, which has inadvertently been poured into the housing, expand due to heating of the electrical components. The particular structure shown in the preferred embodiment of the diaphragm and seam arrangement provides these advantages while remaining relatively simple and easy to manufacture. More particularly, the disclosed diaphragm and seam arrangement may be formed in a single rolling process.

What is claimed is:

1. A housing assembly for electrical components comprising:

- a housing having at least one electrical component located therein, said housing having a continuous peripheral wall defining an opening,
- a cover member for sealing said opening fastened to the top of the wall of the housing by a continuous seam and having a depressed area adjacent the interior of said wall and completely formed therearound which forms with the remainder of the cover a diaphragm-type member, said depressed area comprising a continuous channel formed about the periphery of the cover.

2. A housing assembly for electrical components comprising:

- a housing having at least one electrical component located therein, wherein potting material is disposed within the housing in intimate contact with said component, said housing having a continuous peripheral wall defining an opening,
- a cover member for sealing said opening fastened to the top of the wall of the housing by a continuous seam and having a depressed area adjacent the interior of said wall and completely formed therearound which forms with the remainder of the cover in a diaphragm-type member.

3. A housing assembly as recited in claim 2 wherein the wall of the housing has an opening formed therein, which opening has a fitting located therein having at least one lead wire passing therethrough so that the opening in the side wall is fluidly sealed.

4. A housing as recited in claim 3 wherein said fitting located in the housing side wall does not contact the potting material.

5. A housing as recited in claim 4 wherein the fitting provides a waterproof closure for the opening.

6. A housing as recited in claim 2 wherein a major portion of the potting material fills the housing to a predetermined height slightly less than the height of the side walls, the height of the potting material being less than said predetermined height at portions immediately adjacent to the housing said walls forming an interior peripheral void within the housing.

7. A housing according to claim 6 wherein the depressed area extends into the interior peripheral void.

8. A method of forming a housing for an electrical component comprising the steps of:

- providing a hollow housing having a continuous wall defining an opening,
- placing said electrical component within said housing,
- filling the housing with potting compound and leaving a continuous void area around the interior of the wall,
- placing a cover over said opening, and
- forming a seam between the top of the housing wall and the cover to close said opening, and making a continuous depressed channel in a portion of the cover with respect to the remainder thereof in the area where the void of potting material was left.

9. A method as recited in claim 8 further comprising the step of passing at least one lead wire through a fitting positioned in the wall of the housing and protecting the fitting during the potting step.

10. A method as recited in claim 8 wherein the step of forming a seam includes rolling a double seam between the cover and the housing while simultaneously forming the depressed channel.

11. A method as recited in claim 8 further comprising, prior to filling the housing with potting compound, placing a frame having a spacer member connected thereto within the top of the housing so that the continuous void area will be formed, and removing the frame subsequent to filling the housing with potting material.

12. A method as recited in claim 8, further comprising, prior to filling the housing with potting compound, placing a guide plate comprising a frame having an aperture formed therein with a spacer formed around the periphery of said aperture over the top of said housing so that said spacer extends into the housing adjacent the upper interior of the wall so that upon filling the housing with potting compound, the spacer causes an area to be formed around the periphery of the housing opening which is void of potting compound.

13. A guide plate for use in potting components within a housing, which housing includes walls forming an opening at the top thereof, comprising:

- a frame having a pair of side legs connected at their ends by a pair of bridging legs, said side and bridging legs having inner edges defining an aperture in said frame;
- a spacer integral with said side and end legs formed continuously around the periphery of the frame aperture adapted to be received within said housing opening and extend a limited distance within said housing upon positioning said frame over said housing with the side and end legs supported by the tops of the housing walls.

14. A guide plate as recited in claim 13, further including means formed on said spacer for overlying a fitting positioned within one of said housing walls.

* * * * *